(12) United States Patent
Enokido

(10) Patent No.: US 8,656,981 B2
(45) Date of Patent: Feb. 25, 2014

(54) METHOD OF PRODUCING TIRE VULCANIZATION MOLD, AND TIRE VULCANIZATION MOLD

(75) Inventor: Kenji Enokido, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/809,518

(22) PCT Filed: Jul. 20, 2011

(86) PCT No.: PCT/JP2011/066412
§ 371 (c)(1),
(2), (4) Date: Jan. 10, 2013

(87) PCT Pub. No.: WO2012/011483
PCT Pub. Date: Jan. 26, 2012

(65) Prior Publication Data
US 2013/0196014 A1 Aug. 1, 2013

(30) Foreign Application Priority Data

Jul. 21, 2010 (JP) ................................ 2010-164287

(51) Int. Cl.
*B22C 9/00* (2006.01)
*B22C 7/00* (2006.01)

(52) U.S. Cl.
USPC ................ 164/15; 164/45; 164/159; 164/235

(58) Field of Classification Search
USPC ................. 164/6, 15, 45, 137, 159, 235, 271; 249/56
See application file for complete search history.

(56) References Cited

U.S. PATENT DOCUMENTS

| | | | | |
|---|---|---|---|---|
| 7,384,252 | B2 * | 6/2008 | Iwamoto et al. | 425/28.1 |
| 7,402,031 | B2 * | 7/2008 | Hyakutake et al. | 425/28.1 |
| 8,127,822 | B2 * | 3/2012 | Hyodo | 164/6 |

FOREIGN PATENT DOCUMENTS

| | | |
|---|---|---|
| JP | 62-199242 A | 9/1987 |
| JP | 11-300746 A | 11/1999 |
| JP | 2000-229322 A | 8/2000 |

(Continued)

OTHER PUBLICATIONS

Machine translation of JP 2005-131685 A.*

(Continued)

*Primary Examiner* — Kevin P Kerns
(74) *Attorney, Agent, or Firm* — Cheng Law Group, PLLC

(57) ABSTRACT

A root portion 7a of a sipe blade 7 that protrudes from a surface 12a of a plaster casting mold 12 is coated with a coating layer 10 of an easily collapsible refractory material. A string-shaped exhaust hole forming member 11 of a casting refractory material is attached to the sipe blade 7 so as to be in contact with the coating layer 10. Molten metal M is poured onto the surface 12a of the plaster casting mold 12 in this state so as to cast a mold with the shape of the surface 12a transferred thereon and with the root portion 7a of the sipe blade 7 cast therein. The coating layer 10 is thereafter removed to form a slit around the root portion 7a of the sipe blade 7. The exhaust hole forming member 11 is also removed to form an exhaust hole communicating with the outside of the piece. Therefore, the slit and the exhaust hole communicate with each other. In this way, a mold provided with an exhaust mechanism can be simply produced.

18 Claims, 6 Drawing Sheets

(56) References Cited

FOREIGN PATENT DOCUMENTS

| | | | | |
|---|---|---|---|---|
| JP | 2001-150443 A | | 6/2001 | |
| JP | 2003-236642 A | | 8/2003 | |
| JP | 2005-131685 A | * | 5/2005 | ............. B22D 19/16 |
| JP | 2005-193577 A | | 7/2005 | |
| JP | 2006-212849 A | | 8/2006 | |
| JP | 2008-260135 A | | 10/2008 | |

OTHER PUBLICATIONS

International Search Report for the Application No. PCT/JP2011/066412 mailed Sep. 20. 2011.

Notification of Reasons for Refusal tor the Application No. 2010-164287 from Japan Patent Office dated Oct. 27, 2011.

The First Office Action for the Application No. 201180035679.2 from the State Intellectual Property Office of the People's Republic of China dated Aug. 1, 2013.

* cited by examiner

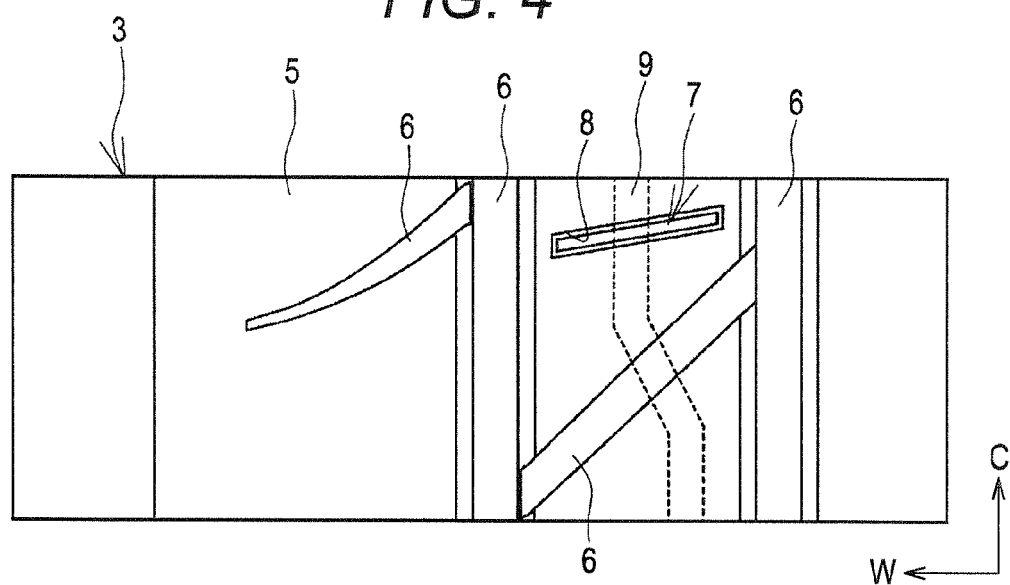
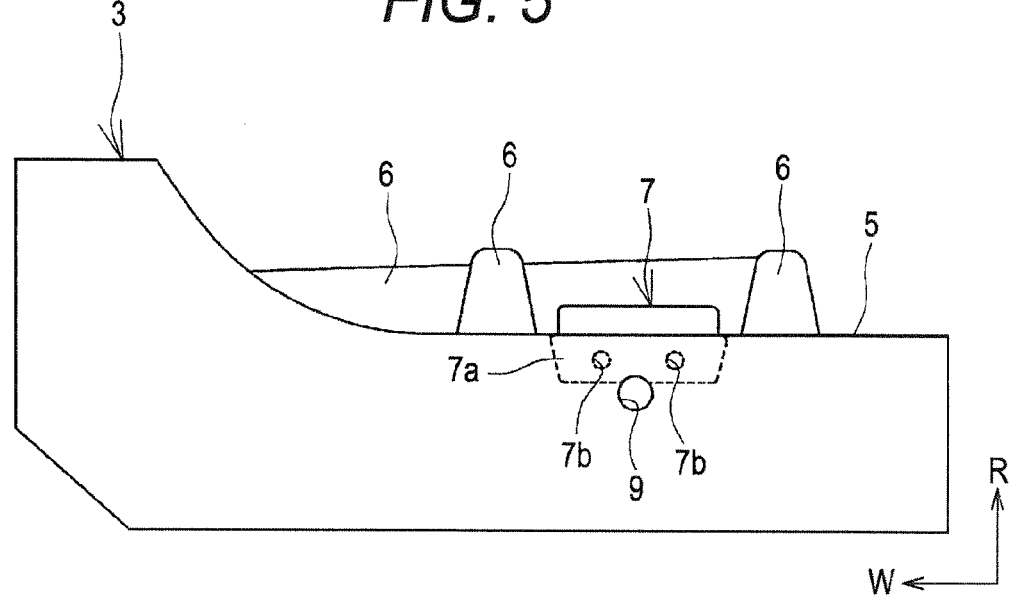

METHOD OF PRODUCING TIRE VULCANIZATION MOLD, AND TIRE VULCANIZATION MOLD

TECHNICAL FIELD

The present invention relates to a method of producing a tire vulcanization mold, and also relates to a tire vulcanization mold. More particularly, the present invention relates to a method of producing a tire vulcanization mold by which a mold with an exhaust mechanism can be simply produced, and a tire vulcanization mold produced by the method.

BACKGROUND ART

A tire vulcanization mold includes an exhaust mechanism. The exhaust mechanism discharges air remaining between a green tire and the mold and gas generated during vulcanization to the outside of the mold. Conventionally, a vent hole has often been used as an exhaust mechanism. However, when rubber flows into the vent hole during vulcanization, a spew is generated. Therefore, various exhaust mechanisms that do not generate a spew have been proposed (see Patent Documents 1 and 2, for example).

In the exhaust mechanism proposed in Patent Document 1, a multilayered blade is used to ensure sufficient ventilation. The multilayered blade is a folded thin plate having an end portion formed by bringing the ends of the plate together and the opposite end portion in which a large gap is formed. A block holds the multilayered blade in place. The block is fitted in a recessed pocket in a tire molding surface of the mold such that an exhaust chamber defined by the pocket and the block is formed. Air and gas are discharged into the exhaust chamber via a fine gap on the one end and a large gap on the other end of the multilayered blade. However, the exhaust mechanism requires steps of forming the pocket in the tire molding surface of the mold formed by casting; producing an assembly of the block holding the multilayered blade; and fitting the assembly in the pocket. Therefore, the exhaust mechanism of Patent Document 1 has a problem of increase in production time due to increase in the number of processing steps.

According to the invention described in Patent Document 2, when casting pieces that constitute a mold, molten metal is divided into a plurality of batches and then shot into a cast. The shots lead to the formation of a fine gap at a cast joint portion between the cast pieces due to solidification shrinkage of the molten metal. The gap serves as an exhaust passage. According to this invention, however, molten metal should be shot into a cast in a plurality of times, resulting in a problem of increase in production time due to increase in the number of processing steps.

PRIOR ART DOCUMENTS

Patent Documents

Patent Document 1: Japanese Patent Application Laid-Open No. 2008-260135
Patent Document 2: Japanese Patent Application Laid-Open No. 2000-22932.2

DISCLOSURE OF THE INVENTION

Problems to be Solved by the Invention

An object of the present invention is to provide a method of producing a tire vulcanization mold by which a mold provided with an exhaust mechanism can be simply produced, and to provide a tire vulcanization mold produced by the method.

Solutions to the Problems

In order to achieve the object, the present invention provides a method of producing a tire vulcanization mold for producing a mold having a surface shape of a plaster casting mold transferred thereon by pouring molten metal onto the surface of the plaster casting mold and solidifying the molten metal, the method being characterized by bringing a root portion of a sipe blade protruding from the surface of the plaster casting mold, the root portion protruding from the surface of the plaster casting mold, to a state of being covered with a coating layer of an easily collapsible refractory material; casting a mold with the shape of the surface of the plaster casting mold transferred thereon and with the root portion of the sipe blade cast therein by pouring molten metal onto the surface of the plaster casting mold of this state; and forming a slit around the root portion of the sipe blade by removing the coating layer after the casting and allowing the slit to communicate with an exhaust hole that communicates with the outside of the mold.

A tire vulcanization mold according to the present invention includes a sipe blade protruding from a tire molding surface and is produced by solidifying molten metal and is characterized by including a slit around a root portion of the sipe blade, the sipe blade being cast in the tire molding surface. The slit is formed by removing a coating layer of an easily collapsible refractory material covering the root portion of the sipe blade, the slit communicating with an exhaust hole that communicates with the outside of the mold.

According to the method of producing a tire vulcanization mold of the present invention, the slit is formed around the root portion of the sipe blade by bringing the root portion of the sipe blade protruding from the surface of the plaster casting mold, the root portion protruding from the surface of the plaster casting mold, to the state of being covered with the coating layer of an easily collapsible refractory material; casting the mold on which the surface shape of the plaster casting mold is transferred and in which the root portion of the sipe blade is cast by pouring the molten metal onto the surface of the plaster casting mold of this state; and removing the coating layer after the casting. Thus, the process of forming the slit is simplified. The slit is allowed to communicate with the exhaust hole that communicates with the outside of the mold, thus providing an exhaust mechanism.

The method makes it possible to simply obtain a tire vulcanization mold of the present invention having an exhaust mechanism.

In the method of producing a tire vulcanization mold according to the present invention, a through hole may be provided in the root portion of the sipe blade, and the molten metal may be poured while an area around the through hole is not coated with the coating layer such that the base material of the blade is exposed in the area. Thus, even when the coating layer is removed after the mold is cast, the molten metal that has solidified in the area around the through hole and the mot portion of the sipe blade are intimately joined to each other. Therefore; the sipe blade is strongly fixed onto the mold.

The thickness of the coating layer is 0.02 mm to 0.10 mm, for example. In this way, sufficient ventilation can be ensured via the slit while the formation of a spew can be reliably prevented.

A string-shaped exhaust hole forming member of a casting refractory material may be attached to the sipe blade, which is protruding from the surface of the plaster casting mold, so as to be in contact with the coating layer coating the root portion. The exhaust hole forming member may be disposed such that the exhaust hole forming member is partially exposed on the mold when the mold is cast by pouring the molten metal. The mold may be cast by pouring the molten metal onto the surface of the plaster casting mold in this state. The exhaust hole forming member may be removed after the casting to form the exhaust hole. In this way, a cutting process for forming the exhaust hole can be eliminated.

By this method, a tire vulcanization mold with an exhaust hole of an arbitrary shape that cannot be formed by a cutting process, such as a bent shape, can be obtained.

A projecting portion may be provided on the root portion of the sipe blade, and the exhaust hole forming member may be attached to the sipe blade by thrusting the exhaust hole forming member into the projecting portion. Alternatively, a cutout portion may be provided on the root portion of the sipe blade, and the exhaust hole forming member may be attached to the sipe blade by fitting the exhaust hole forming member in the cutout portion. By providing the projecting portion or the cutout portion, the exhaust hole forming member can be attached to the sipe blade in a simple and stable manner. Thus, the problem of the exhaust hole forming member moving at the time of pouring can be prevented.

These and other objects, features, aspects, and advantages of the present invention will become more apparent from the following detailed description and the accompanying drawings.

BRIEF DESCRIPTION OF THE DRAWINGS

FIG. 4 is a plan view of a left half of the piece of FIG. 3.
FIG. 5 is a front view of FIG. 4.

DESCRIPTION OF EMBODIMENTS

Figure 1:
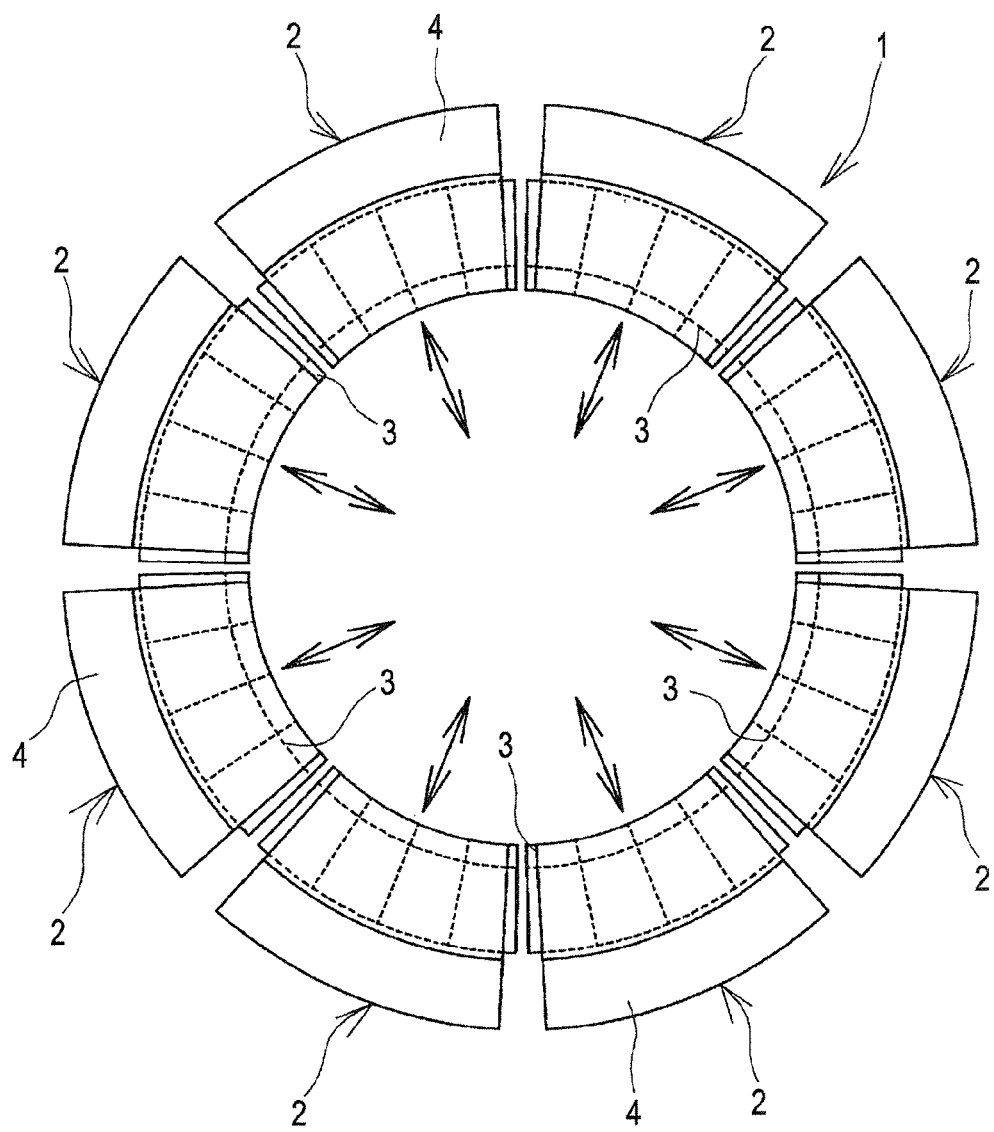
FIG. 1 is a plan view of a tire vulcanization mold according to the present invention.

In the following a method of producing a tire vulcanization mold and a tire vulcanization mold according to the present invention will be described with reference to embodiments shown in the drawings. Arrows C, R, and W shown in the drawings respectively indicate the circumferential direction, the radial direction, and the width direction of a green tire to be inserted into the vulcanization mold and vulcanized.

Figure 2:
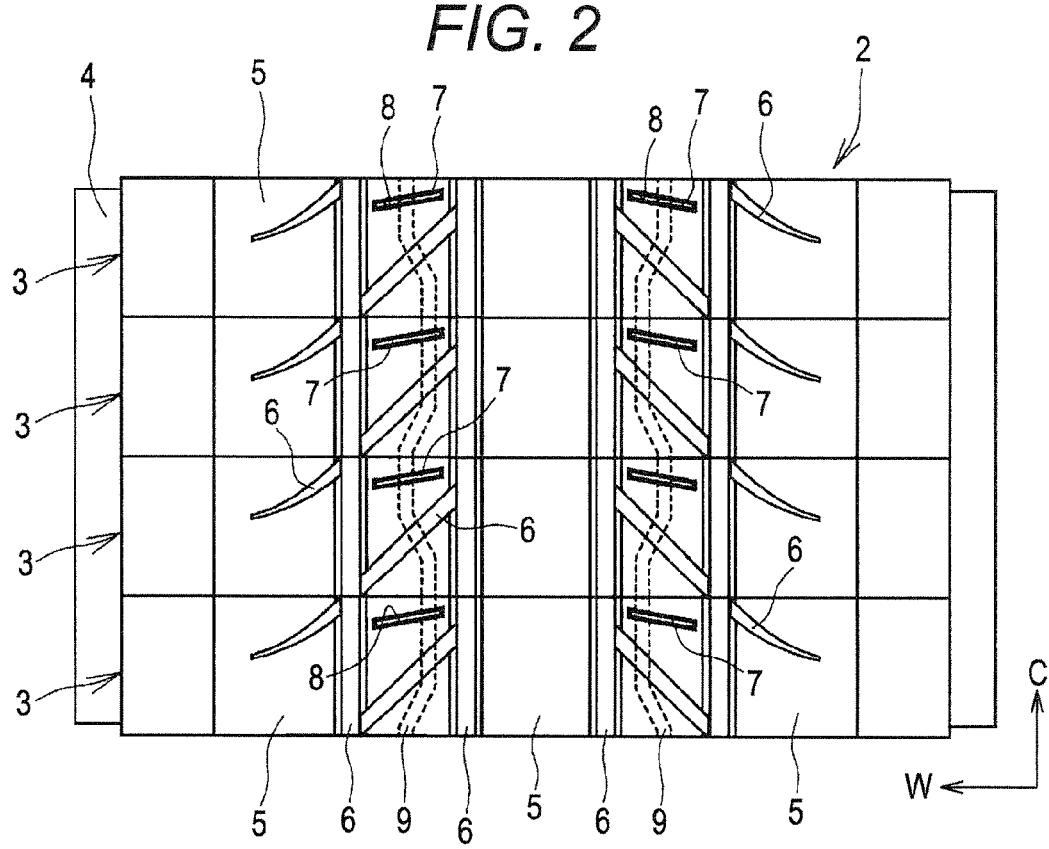
FIG. 2 is a plan view of a sector of FIG. 1.
Figure 3:
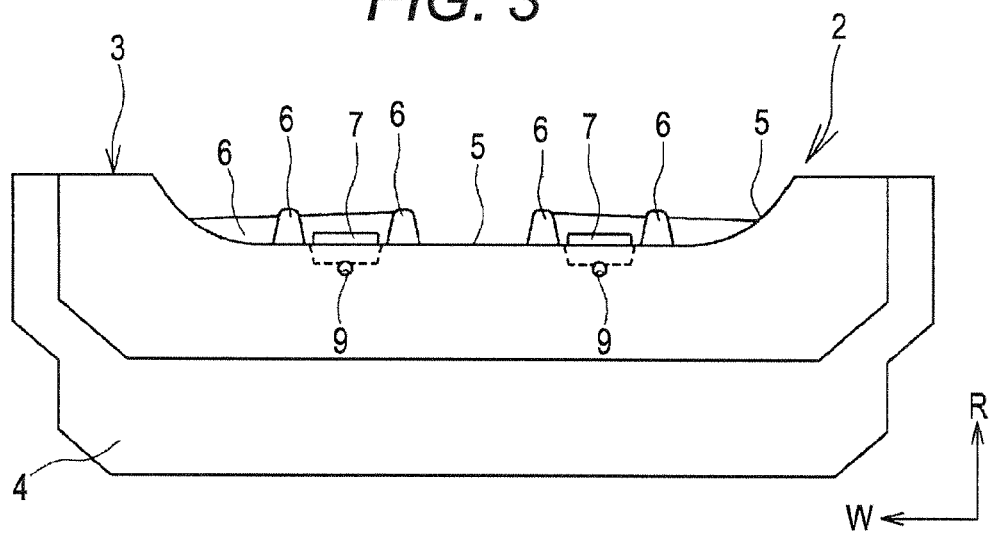
FIG. 3 is a front view of FIG. 2.

As illustrated in FIG. 1, a tire vulcanization mold 1 (hereafter "mold 1") according to the present invention includes a plurality of sectors 2 assembled in a ring shape. Namely, the mold 1 is of a sectional type. As illustrated in FIGS. 2 and 3, the sectors 2 include a plurality of pieces 3 and a back block 4. The pieces 3 are attached to the back block 4 such that the pieces 3 that are adjacent to each other are in intimate contact with each other. According to the present embodiment, four pieces 3, which are rectangular in a plan view, are fixed to each of the sectors 2. The inner circumferential surface of each of the pieces 3 serves as a tire molding surface 5. The pieces 3 are formed by solidifying molten metal M. The molten metal M is a molten material of metal, such as aluminum or aluminum allay.

As illustrated in FIGS. 4 and 5, on the tire molding surface 5, groove molding projections 6 for forming tire grooves are provided integrally with the piece 3. Also on the tire molding surface 5, a sipe blade 7 made of stainless steel or the like is protruded. The sipe blade 7 includes a root portion 7a that is cast in the tire molding surface 5. The thickness of the sipe blade 7 is about 0.4 mm to 1.2 mm.

A slit 8 is formed around the root portion 7a of the sipe blade 7, which is covered with a coating layer 10. After the piece 3 is cast, the slit 8 is formed by removal of the coating layer 10, which will be described later. The slit 8 communicates with an exhaust hole 9 that communicates with the outside of the piece 3 (mold 1).

Preferably, the slit 8 has a gap in a range of 0.02 mm to 0.10 mm so as to prevent generation of a spew while ensuring sufficient ventilation through the slit 8. In FIG. 4, the gap of the slit 8 is illustrated larger than its actual size. The exhaust hole 9 according to the present embodiment is formed by removal of a string-shaped exhaust hole forming portion, which will be described later, after the piece 3 is cast. The size of the exhaust hole 9 is about 1 mm to 10 mm in terms of outer diameter. In FIG. 4, the exhaust hole 9 is bent. However, the exhaust hole 9 may be straight.

When a green tire is vulcanized using the mold 1 composed of the pieces 3, unwanted air and gas are discharged via the slit 8 into the exhaust hole 9 and further outside the mold 1 through end surfaces of the sectors 2, for example. Thus, appropriate ventilation can be ensured during vulcanization, so that tire vulcanization failure is prevented.

The pieces 3 are produced by the following method.

Figure 6:
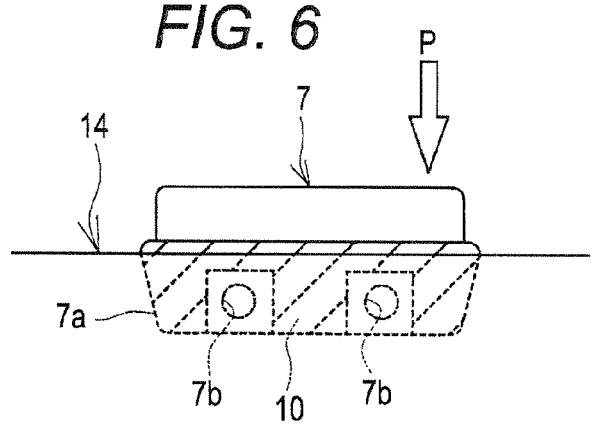
FIG. 6 illustrates a step of pouring plaster onto the surface of a rubber mold on which a sipe blade is protruded.

As illustrated in FIG. 6, the root portion 7a of the sipe blade 7 is embedded in a rubber mold 14, with the sipe blade 7 protruding from the surface of the rubber mold 14. The rubber mold 14 is formed by transferring the surface shape of a master mold.

Figure 7:
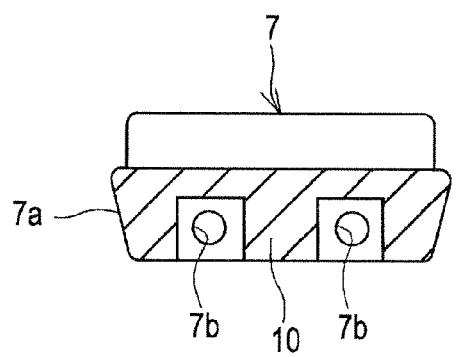
FIG. 7 is a front view of the sipe blade of FIG. 6.

Preferably, as illustrated in FIG. 7, the surface of the root portion 7a of the sipe blade 7 is coated with the coating layer 10 in advance. In the drawing, the coating layer 10 is indicated by hatching. The root portion 7a of the sipe blade 7 includes through holes 7b. Preferably, areas around the through holes 7b are not coated with the coating layer 10 such that the base material of the sipe blade 7 is exposed. By removing the coating layer 10 in a subsequent step, the slit 8 is formed. Thus, the thickness of the coating layer 10 is set in a range of 0.02 mm to 0.10 mm.

The coating layer 10 is formed of an easily collapsible refractory material that is readily dissolved in water or readily collapsed by shock. The easily collapsible refractory material includes solid matter containing a facing material, plaster, and a graphite-based mold releasing agent, for example. The facing material is applied onto areas of casting dies that are in contact with hot metal. The facing material functions as a heat insulator or a protection material for the casting dies. The constituents of the facing material include water, silicate soda, vermiculite, mica, and bentonite. The constituents of the graphite-based mold releasing agent include graphite, n-hexane, dimethyl ether, and the like.

Figure 8:
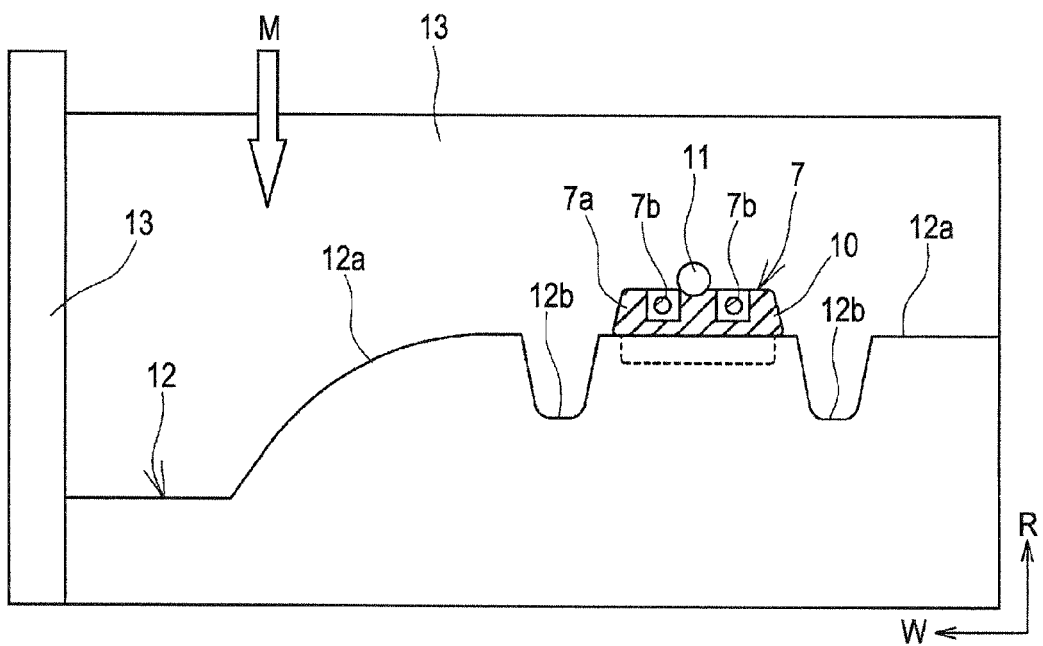
FIG. 8 is a front view illustrating a step of pouring molten metal onto the surface of a plaster casting mold including the sipe blade to which an exhaust hole forming member is attached.

Plaster P is poured onto the surface of the rubber mold 14 to produce a plaster casting mold 12 on which the surface shape of the rubber mold 14 is transferred. On a surface 12a of the plaster casting mold 12 thus produced, the sipe blade 7 is protruded, as illustrated in FIG. 8. The root portion 7a of the sipe blade 7 protrudes from the surface 12a of the plaster casting mold 12 and is thus exposed. Grooves 12b of the plaster casting mold 12 correspond to the groove molding projections 6 of the mold 1.

Figure 9:
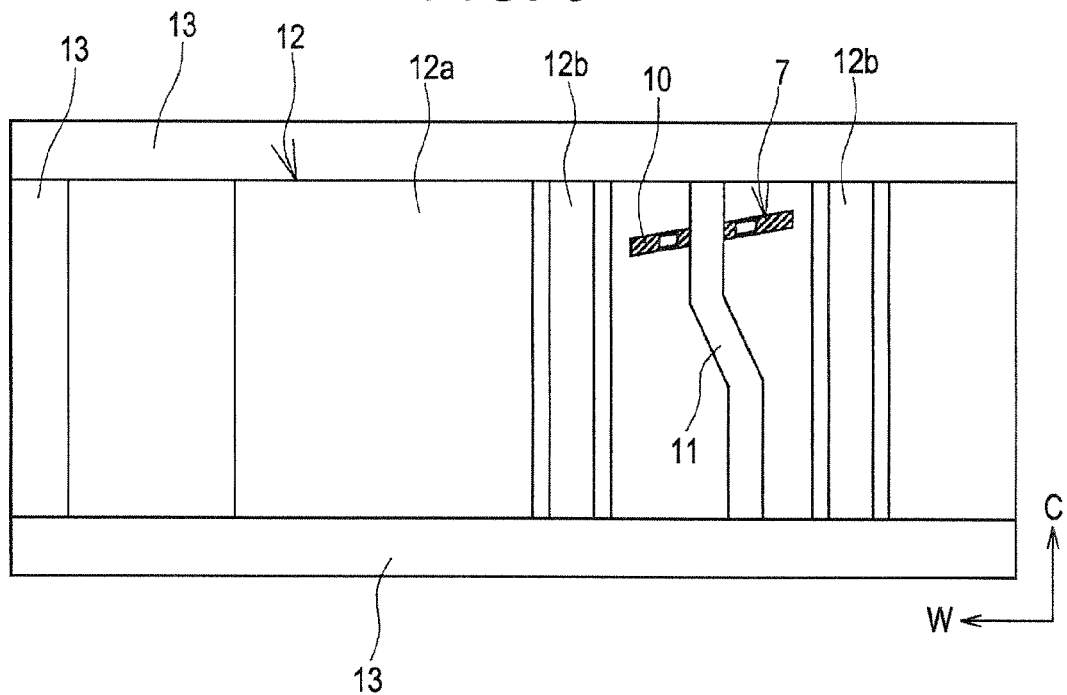
FIG. 9 is a plan view illustrating the step of FIG. 8.

Next, the molten metal M is poured onto the surface of the plaster casting mold 12 to cast the mold 1. At this time, as illustrated in FIGS. 8 and 9, a string-shaped exhaust hole forming member 11 of a casting refractory material is attached to the sipe blade 7 protruding from the surface 12a of the plaster casting mold 12. The exhaust hole forming member 11 is attached to the sipe blade 7 so as to be in contact with the coating layer 10 coating the root portion 7a. At this time, the exhaust hole forming member 11 is extended until its ends come in contact with mold frames 13. The exhaust hole forming member 11 is disposed such that the exhaust hole forming member 11 is partly exposed on the mold 1 when the mold 1 is cast by pouring the molten metal M. The exhaust hole forming member 11 is removed in a subsequent step to form the exhaust hole 9. Thus, the thickness of the exhaust hole forming member 11 is about 1 mm to 10 mm in terms of outer diameter.

Figure 10:
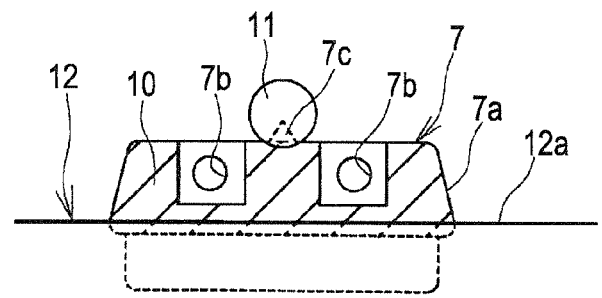
FIG. 10 is an enlarged front view of the sipe blade and the exhaust hole forming member of FIG. 8.
Figure 11:
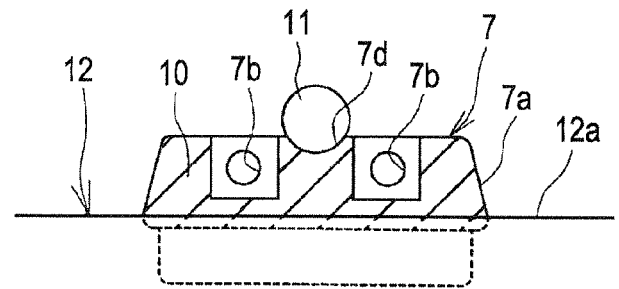
FIG. 11 is front view of a modification of the sipe blade of FIG. 10.

As illustrated in FIG. 10, a projecting portion 7c may be provided on the root portion 7a of the sipe blade 7 and the exhaust hole forming member 11 may be attached to the sipe blade 7 by thrusting the exhaust hole forming member 11 into the projecting portion 7c. Alternatively, as illustrated in FIG. 11, a cutout portion 7d may be provided on the root portion 7a of the sipe blade 7 and the exhaust hole forming member 11 may be attached to the sipe blade 7 by fitting the exhaust hole forming member 11 in the cutout portion 7d. By providing the projecting portion 7c or the cutout portion 7d, the exhaust hole forming member 11 can be attached to the sipe blade 7 in a simple and stable manner. Thus, the problem of the exhaust hole forming member 11 moving at the time of pouring can be prevented.

The exhaust hole forming member 11 is made of a casting refractory material. The casting refractory material is placed at areas that are in contact with hot metal, such as surfaces of an aluminum melting furnace or a casting frame. The exhaust hole forming member 11 functions to prevent erosive wear or the like by aluminum hot metal. The casting refractory material includes a mold seal and a casting heat insulating material, for example.

The mold seal includes kaolin, bentonite, talc, and mineral oil as principal components. The casting heat insulating material includes alumina and silica as principal components. The mold seal has plasticity. Thus, the mold seal can be easily deformed into an arbitrary shape. Therefore, by using the mold seal as the exhaust hole forming member 11, the exhaust hole 9 with an arbitrary shape that cannot be formed by a cutting process, such as a bent exhaust hole, can be formed.

By pouring the molten metal M onto the surface 12a of the plaster casting mold 12 in this state and then solidifying the molten metal M, the piece 3 with the shape of the surface 12a of the plaster casting mold 12 transferred thereon is cast. On the surface (tire molding surface 5) of the cast piece 3, the sipe blade 7 is protruded. On end surfaces of the piece 3, the exhaust hole forming member 11 is partially exposed. The root portion 7a of the sipe blade 7 is cast in the piece 3 while being covered with the coating layer 10.

Figure 12:
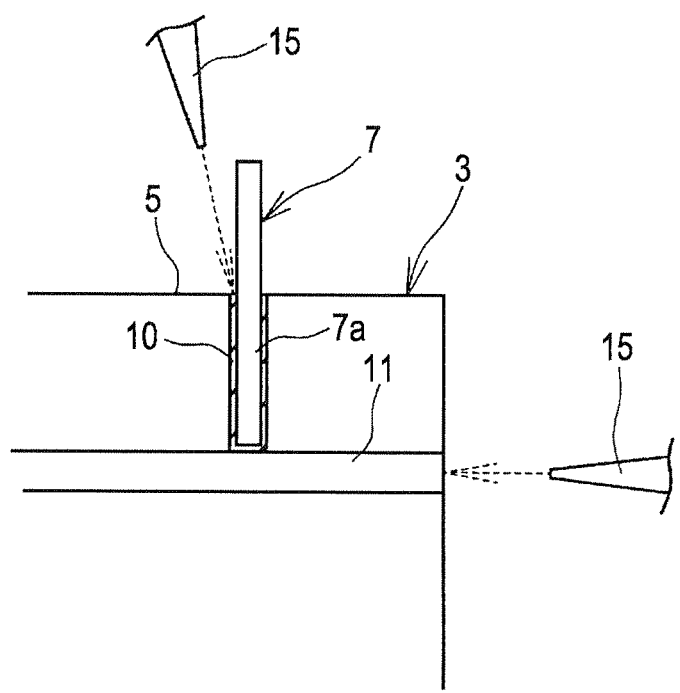
FIG. 12 is a cross sectional view illustrating a step of removing a coating layer cast in a cast piece and the exhaust hole forming member.

Then, the coating layer 10 and the exhaust hole forming member 11 are removed from the cast piece 3. For example, as illustrated in FIG. 12, high pressure water ejected out of an injection nozzle 15 is sprayed onto the coating layer 10 and the exhaust hole forming member 11 so as to remove the coating layer 10 and the exhaust hole forming member 11. The areas from which the coating layer 10 has been removed serve as the slit 8. The areas from which the exhaust hole forming member 11 has been removed serve as the exhaust hole 9. The exhaust hole forming member 11 is partially exposed on the end surfaces of the piece 3. Thus, the exhaust hole 9 that has been formed communicates with the outside of the piece 3. Furthermore, because the exhaust hole forming member 11 has been in contact with the coating layer 10, the slit 8 and the exhaust hole 9 communicate with each other.

As described above, in the casting step, the molten metal M is poured onto the surface 12a of the plaster casting mold 12 and then solidified. Through the casting step and the step of removing the coating layer 10, the slit 8 constituting an exhaust mechanism can be simply formed in the tire molding surface 5 of the pieces 3. Furthermore, according to the present embodiment, through the casting step and the step of removing the exhaust hole forming member 11, the exhaust hole 9 can be simply formed. Thus, a cutting process for forming the exhaust hole 9 after the piece 3 is cast can be eliminated.

The piece 3 may be cast by pouring the molten metal M onto the surface 12a of the plaster casting mold 12 instead of attaching the exhaust hole forming member 11 to the sipe blade 7. In this case, the piece 3 is cast, and the coating layer 10 is then removed to form the slit 8. On the other hand, the exhaust hole 9 should be separately formed. Thus, the exhaust hole 9 communicating with the slit 8 and with the outside of the piece 3 is formed by cutting the piece 3.

According to the present embodiment, casting of the piece 3 is performed such that the molten metal M is poured around the through holes 7b while the base material of the sipe blade 7 is being exposed. Thus, even when the coating layer 10 is removed after the mold 1 is cast, the molten metal M that has solidified in the areas around the through holes 7b and the root portion 7a of the sipe blade 7 are intimately joined to each other. Thus, because the sipe blade 7 is strongly fixed onto the mold 1, it is not readily removed.

This application is based on Japanese Patent Application No. 2010-164287 filed in Japan on Jul. 21, 2010 by the same applicant, the entire content of which is hereby incorporated, by reference.

The foregoing description of the specific embodiments of the present invention is for illustrative purpose only and not intended to be exhaustive or limit the present invention as described. It is obvious to those skilled in the art that various modifications and variations can be made in view of the foregoing description.

DESCRIPTION OF REFERENCE SIGNS

1 Mold
2 Sector
3 Piece
4 Back block
5 Tire molding surface
6 Groove molding projections
7 Sipe blade
7a Root portion
7b Through hole
7c Projecting portion
7d Cutout portion
8 Slit
9 Exhaust hole 10 Coating layer
11 Exhaust hole forming member
12 Plaster casting mold
12a Surface
12b Groove
13 Mold frame
14 Rubber mold
15 Injection nozzle
M Molten metal
P Plaster

The invention claimed is:

1. A method of producing a tire vulcanization mold for producing a mold having a surface shape of a plaster casting mold transferred thereon by pouring molten metal onto a surface of the plaster casting mold and solidifying the molten metal, comprising:
    bringing a root portion of a sipe blade projected to the surface of the plaster casting mold, the root portion protruding from the surface of the plaster casting mold, to a state of being covered with a coating layer of an easily collapsible refractory material;
    casting a mold with the shape of the surface of the plaster casting mold transferred thereon and with the root portion of the sipe blade cast therein by pouring the molten metal onto the surface of the plaster casting mold of this state; and
    forming a slit around the root portion of the sipe blade by removing the coating layer after the casting, and allowing the slit to communicate with an exhaust hole that communicates with an outside of the mold.

2. The method of producing the tire vulcanization mold according to claim 1, comprising:
    providing a through hole in the root portion of the sipe blade; and
    pouring the molten metal in a state of an area around the through hole not being covered with the coating layer and thus a base material of the blade being left exposed.

3. The method of producing the tire vulcanization mold according to claim 2, wherein the coating layer has a thickness of 0.02 mm to 0.10 mm.

4. The method of producing the tire vulcanization mold according to claim 3, comprising:
    attaching a string-shaped exhaust hole forming member of a casting refractory material to the sipe blade projected to the surface of the plaster casting mold, so as to be in contact with the coating layer covering the root portion;
    disposing the exhaust hole firming member so as to be partially exposed on the mold when the mold is cast by pouring the molten metal;
    casting the mold by pouring the molten metal onto the surface of the plaster casting mold of this state; and
    forming the exhaust hole by removing the exhaust hole forming member alter the mold is cast.

5. The method of producing the tire vulcanization mold according to claim 4, comprising:
    providing a projecting portion on the root portion of the sipe blade; and
    attaching the exhaust hole forming member to the sipe blade by thrusting the exhaust hole forming member into the projecting portion.

6. The method of producing the tire vulcanization mold according to claim 4, comprising:
    providing a cutout portion in the root portion of the sipe blade; and
    attaching the exhaust hole forming member to the sipe blade by fitting the exhaust hole forming member in the cutout portion.

7. The method of producing the tire vulcanization mold according to claim 2, comprising:
    attaching a string-shaped exhaust hole forming member of a casting refractory material to the sipe blade projected to the surface of the plaster casting mold, so as to be in contact with the coating layer covering the root portion;
    disposing the exhaust hole forming member so as to be partially exposed on the mold when the mold is cast by pouring the molten metal;
    casting the mole by pouring the molten metal onto the surface of the plaster casting mold of this state; and
    forming the exhaust hole by removing the exhaust, hole forming member after the mold is cast.

8. The method of producing the tire vulcanization mold according to claim 7, comprising:
    providing a projecting portion on the root portion of the sipe blade; and
    attaching the exhaust hole forming member to the sipe blade by thrusting the exhaust hole forming member into the projecting portion.

9. The method of producing the tire vulcanization mold according to claim 7, comprising:
    providing a cutout portion in the root portion of the sipe blade; and
    attaching the exhaust hole forming member to the sipe blade by fitting, the exhaust hole forming member in the cutout portion.

10. The method of producing the tire vulcanization mold according to claim 1, wherein the coating layer has a thickness of 0.02 mm to 0.10 mm.

11. The method of producing the tire vulcanization mold according to claim 10, comprising:
    attaching a string-shaped exhaust hole forming member of a casting refractory material to the sipe blade projected to the surface of the plaster casting mold, so as to be in contact with the coating layer covering the root portion;
    disposing the exhaust hole forming member so as to be partially exposed on the mold when the mold is cast by pouring the molten metal;
    casting the mold by pouring the molten metal onto the surface of the plaster casting mold of this state; and
    forming the exhaust hole by removing the exhaust hole forming member after the mold is cast.

12. The method of producing the tire vulcanization mold according to claim 11, comprising:
    providing a projecting portion on the root portion of the sipe blade, and
    attaching the exhaust hole forming member to the sipe blade by thrusting the exhaust hole forming member into the projecting portion.

13. The method of producing the tire vulcanization mold according to claim 11, comprising:
    providing a cutout portion in the root portion of the sipe blade; and
    attaching the exhaust hole forming member to the sipe blade by fitting the exhaust hole forming member in the cutout portion.

14. The method of producing the tire vulcanization mold according to claim 1, comprising:
    attaching a string-shaped exhaust hole forming member of a casting refractory material to the sipe blade projected to the surface of the plaster casting mold, so as to be in contact with the coating layer covering the root portion;
    disposing the exhaust hole forming member so as to be partially exposed on the mold when the mold is cast by pouring the molten metal;

casting the mold by pouring the molten metal onto the surface of the plaster casting mold of this state; and forming the exhaust hole by removing the exhaust hole forming member after the mold is cast.

15. The method of producing the tire vulcanization mold according to claim 14, comprising:

providing a projecting portion on the root portion of the sipe blade; and attaching the exhaust hole forming member to the sipe blade by thrusting the exhaust hole forming member into the projecting portion.

16. The method of producing the tire vulcanization mold according to claim 14, comprising:

providing a cutout portion in the root portion of the sipe blade; and attaching the exhaust hole forming member to the sipe blade by fitting the exhaust hole forming member in the cutout portion.

17. A tire vulcanization mold including a sipe blade projected to a tire molding surface and produced by solidifying molten metal, wherein the tire vulcanization mold comprises:

groove molding projections formed on the tire molding surface;

a slit around a root portion of the sipe blade, the sipe blade being cast in the tire molding surface;

the slit is formed by removing a coating layer of an easily collapsible refractory material covering the root portion of the sipe blade after the mold is cast;

the slit being spaced apart from the groove molding projections; and the slit directly communicates with an exhaust hole that directly communicates with an outside of the mold.

18. The tire vulcanization mold according to claim 17, wherein the exhaust hole extends to the outside of the mold through an end surface of the mold, the end surface being adjacent to the tire molding surface of the mold.

* * * * *